United States Patent Office 3,487,106
Patented Dec. 30, 1969

3,487,106
PREPARATION OF NAPHTHALENE-2,3-DICARBOXYLIC ACID
James W. Patton and Marion O. Son, Jr., Littleton, Colo., assignors to Marathon Oil Company, Findlay, Ohio, a corporation of Ohio
No Drawing. Filed Feb. 8, 1965, Ser. No. 431,188
Int. Cl. C07c 63/38
U.S. Cl. 260—515                                                  8 Claims

ABSTRACT OF THE DISCLOSURE 2,3-dicarboxy naphthalenes are produced from alkali metal 2-naphthoates by a process comprising reacting under anhydrous conditions alkali metal 2-naphthoate in the substantial absence of alkali-1-naphthoate at a temperature of less than about 500° C. with $CO_2$ at a total pressure of at least 50 p.s.i.g.

---

The present invention relates to a new process for the preparation of a specific isomer of naphthalene dicarboxylic acid and in particular relates to the preparation of 2,3-dicarboxylic acid from alkali metal 2-naphthoates.

The 2,3-diacid of naphthalene has potential application in the preparation of specialized polymeric materials and dyes including those of the pthalocyanine type. It has now been found that this specific isomer may be produced by a combination of careful selection of raw materials, exclusion of certain deleterious agents from the reaction mixture, and control of temperature and pressure under which the reaction occurs. Where such selection and control are not exercised, the more common 2,6-dicarboxynaphthalene isomer is in most cases obtained.

The present invention apparently produces the 2,3-portionation of alkali metal 2-naphthoate to yield the acid together wtih naphthalene as a byproduct.

The raw materials for the practice of the present invention are surprisingly critical in that only the alkali metal 2-naphthoates, preferably the sodium or potassium-2-naphthoate and most preferably the sodium-2-naphthoate are operable. Surprisingly, even the sodium-1-naphthoate fails to give any substantial yield of the 2,3-NDA, yielding instead the more common 2,6-NDA as shown in Examples 22, 23, 24, and 25 herein.

The raw materials must be substantially anhydrous, preferably containing less than 1% water and most preferably completely anhydrous since water tends to favor the formation of naphthalene rather than the desired 2,3-NDA. For commercially acceptable yields, the total pressure of the reaction system must be at least 50 p.s.i.g. and preferably will be above about 1,000 p.s.i.g. In general, the higher the reaction pressure, the higher the yields obtained.

The alkali metal 2-naphthoate salts may be prepared by allowing the acid and the alkali hydroxide or carbonate to react in water to form a solution and evaporation of the water to afford the dry salt. Alternatively, some of the alkali metal 2-naphthoates may be produced by conventional oxidation of alkyl hydrocarbons by alkali metal chromates in the presence of $CO_2$.

Certain catalysts have been found to be valuable with the process of the present invention, but they must be carefully selected since other materials conventionally used as catalysts exhibit extremely deleterious effects on the reaction. The preferred catalysts are sodium carbonate potassium carbonate, and cadmium carbonate with cadmium carbonate and sodium carbonate being especially preferred. Cadmium iodide even in relatively minor amounts causes the formation of the 2,6-isomer to the virtually complete exclusion of the 2,3-NDA. The reaction temperature should be less than 500° C. and will preferably be less than about 425° C. in order to favor the formation of the 2,3-isomer. When the reaction is conducted in the presence of a catalytic amount of sodium carbonate the temperature is preferably maintained at from 300 to about 500° C. In general, with the preferred sodium cation catalysts, temperature is less critical and temperatures of up to 500° C. may be employed, while with the potassium and other catalysts, temperatures must generally be below about 425° C.

The process may be practiced on a continuous or on a batch basis, and the apparatus employed will generally be conventional autoclaves. Surprisingly, the presence of iron oxide is not deleterious and, therefore, mild steel equipment may be utilized in place of the more expensive nonferrous metal reactors conventionally employed for similar reactions.

The following examples illustrate the practice of the invention but are to be taken as being merely exemplary and not limitative of the invention.

EXAMPLE 1

To a glass-lined steel reactor immersed in a Wood's metal bath is added by spatula 2.00 g. of the K-2 salt (potassium-2-naphthoate) which has been dried under vacuum at 180° C. for 24 hours. The reaction mixture is heated without agitation under $CO_2$ at about 1,050 p.s.i.g. for about 180 minutes at 400° C. The product mixture is allowed to cool to room temperature, dissolved in hot water, and naphthalene and an insoluble residue are filtered off. The resulting aqueous solution is acidified with hydrochloric acid and refiltered. The solid portion consists primarily of organic carboxylic acids which are vacuum dried and weighed. Trituration with ether followed by an additional filtration yields the ether insoluble acids. Naphthalene-2,6-dicarboxylic acid is virtually insoluble in any solvent and naphthalene-2,3-dicarboxylic acid has a low solubility in ether. Thus, the 2,6-diacid or the 2,3-diacid are separated from the 1- or the 2-naphthoic acid by the ether treatment and filtration.

Infrared spectroscopy was used to characterized the products. Naphthalene-2,6-dicarboxylic acid has an infrared absorption peak at 7.46 microns while the 2,3-diacid is completely blank at this point in the spectrum thus permitting easy detection of the 2,6-diacid. However, because 2-naphthoic acid is difficult to distinguish by infrared from either 2,3-diacid or 2,6-diacid when present in small amounts, all yields and conversions given herein are approximate.

In these examples, naphthalene-2,6-dicarboxylic acid is further characterized by conversion to the corresponding dimethyl ester and comparison of this with authentic 2,6-dimethyl ester, and naphthalene-2,3-dicarboxylic acid is further characterized both by conversion to its corresponding dimethyl ester and to its anhydride and comparison of these materials with authentic samples.

Since the disproportionation reaction of the present invention requires 2 moles of the starting salt to produce 1 mole of the product salt, the following definitions are employed throughout the present application:

$$\text{Percent yield} = \frac{\text{Moles of product}}{\text{Moles of reactant}} \times 200$$

$$\text{Selectivity} = \frac{\text{Moles of product}}{\text{Moles of reactant consumed}} \times 2$$

$$\text{Percent conversion} = \frac{\text{Moles of reactant consumed}}{\text{Moles of reactant}} \times 100$$

All weights reported herein are in grams.
1.28 g. of product acids were produced, including 0.0513 g. 2,3-NDA. The percent yield based on 2,3-NDA was 5%, the selectivity 0.199, and the percent conversion 25.2.

EXAMPLES 2 TO 29

Table 1 summarizes a number of runs made at super atmospheric pressures. These are conducted according to the procedures of Example 1 except that the dry ingredients are contained in a high pressure glass-lined steel autoclave having a volume of about 100 ml. on runs above 5,000 p.s.i. The autoclave is not agitated and is equipped with an iron-constantin thermocouple located just above the reaction mixture on the interior of the autoclave. The autoclave was heated conventionally.

Examples Nos. 1 through 7 indicate the effect of $CO_2$ pressure. No catalyst was used in these runs.

Examples Nos. 8 through 10 illustrate that iron oxides are not deleterious and may have some catalytic effect.

Example No. 11 shows that pressurizing with mixed $N_2$ and $CO_2$ (roughly 50% by volume of each gas) gives satisfactory results.

Example No. 12 shows that at a temperature of 350° C., the 2,3-yield is somewhat low, and that no 2,6-diacid is produced utilizing the cadmium carbonate catalyst. Note that in Example No. 13, at 450° C., the yield of 2,3-diacid is zero and the 2,6-diacid is produced instead, still using the cadmium carbonate catalyst. When the temperature is held at 470° C. even for only ½ hour as in Example No. 14, no 2,3- is produced and only 2,6-diacid is found. Going to higher temperatures, at 500° C. as in Example No. 15 only a black valueless product is produced.

As shown in Example No. 16, where cadmium iodide is present, no 2,3-diacid is produced and only 2,6- is found in the product heated at 400° C.

Examples Nos. 17 through 19 show that mixed sodium and potassium carbonates give the 2,3-diacid and that the sodium-2-naphthoate is operative with the present invention. Example No. 20 shows that with cadmium carbonate, the yield of the 2,3-diacid is markedly improved.

Example No. 21 shows that even with the mixed sodium and potassium carbonate catalyst, temperatures of 450° C. give the 2,6-isomer only. Also, Examples Nos. 22 through 25 indicate that the 1-naphthoate gives only the 2,6- and none of the 2,3-diacid regardless of the temperature. Similarly, Example No. 26 shows that even the presence of the 1-naphthoate salt mixed with the 2-naphthoate yields only 2,6-diacid.

Examples Nos. 27 through 29 show that with the sodium-2-naphthoate, sodium carbonate gives the 2,3-diacid even at temperatures up to 450 to 500° C. The use of sodium-2-naphthoate with sodium carbonate catalyst is preferred for its lack of sensitivity to temperature.

TABLE 1.—REACTION AT SUPER-ATMOSPHERIC PRESSURES

| Ex. No. | Run No. | Carboxylate salt used | Time (hrs.) | Temp. (° C) | CO₂ Press. (p.s.i.g.) | Wt. of salt | Wt. of K₂CO₃ | Wt. of CdCO₃ |
|---|---|---|---|---|---|---|---|---|
| 1 | 344 | K-2 | 3 | 400 | 1,050 | 2.00 | 0 | 0 |
| 2 | 338 | K-2 | 3 | 400 | 2,900 | 1.99 | 0 | 0 |
| 3 | 343 | K-2 | 3 | 400 | 4,700 | 20.5 | 0 | 0 |
| 4 | 114 | K-2 | 3 | 400 | 5,500 | 2.00 | 0 | 0 |
| 5 | 348 | K-2 | 1¾ | 400 | 5,800 | 0.995 | 0 | 0 |
| 6 | 345 | K-2 | 3 | 400 | 6,050 | 2.00 | 0 | 0 |
| 7 | 346 | K-2 | 3 | 400 | 8,000 | 1.98 | 0 | 0 |
| 8 | 014 | K-2 | 3 | 400 | 5,600 | 1.01 | 0 | 0 |
| 9 | 015 | K-2 | 3 | 400 | 5,750 | 0.946 | 0 | 0 |
| 10 | 016 | K-2 | 3 | 400 | 5,550 | 1.02 | 0 | 0 |
| 11 | 017 | K-2 | 3 | 400 | 3,700 | 0.958 | 0.202 | 0.0622 |
| 12 | 021 | K-2 | 3 | 350 | 6,000 | 0.940 | 0.180 | 0.0449 |
| 13 | 024 | K-2 | 3 | 450 | 6,150 | 1.02 | 0.106 | 0.0613 |
| 14 | 027 | K-2 | ½ | 470 | 5,160 | 1.11 | 0 | 0 |
| 15 | 025 | K-2 | 3 | 500 | 3,250 | 1.17 | 0.207 | 0.0403 |
| 16 | 337 | K-2 | 6 | 400 | | 2.00 | 2.00 | 0 |
| 17 | 365 | Na-2 | 3 | 400 | 6,000 | 1.01 | 0.033 | 0 |
| 18 | 366 | Na-2 | 3 | 400 | 5,050 | 1.00 | 0.110 | 0 |
| 19 | 367 | Na-2 | 3 | 400 | 6,000 | 0.999 | 1.00 | 0 |
| 20 | 370 | Na-2 | 3 | 400 | 3,750 | 1.09 | 0.135 | 0.0834 |
| 21 | 037 | Na-2 | 2 | 450 | 5,850 | 1.00 | 0.219 | 0.0612 |
| 22 | 351 | K-1 | 3 | 400 | 8,000 | 1.95 | 0 | 0 |
| 23 | 041 | Na-1 | 2 | 350 | 6,100 | 1.01 | 0.448 | 0.0693 |
| 24 | 043 | Na-1 | 2 | 400 | 3,500 | 1.00 | 0.456 | 0.118 |
| 25 | 046 | Na-1 | 2 | 450 | 6,200 | 1.02 | 0.500 | 0.171 |
| 26 | 048 | Na-½ | 2 | 400 | 6,000 | 1.06/0.980 | 1.02 | 0.0569 |

| Ex. No. | Run No. | Carboxylate salt used | Time (hrs.) | Temp. (° C) | CO₂ Press. (p.s.i.g.) | Wt. of salt | Wt. of Na₂CO₃ | Wt. of CdCO₃ |
|---|---|---|---|---|---|---|---|---|
| 27 | 364 | Na-2 | 6 | 400 | 5,950 | 0.982 | 0 | 0 |
| 28 | 070 | Na-2 | 4 | 400-500 | 6,000-6,500 | 1.58 | 0.985 | 0.195 |
| 29 | 082 | Na-2 | 2 | 450 | 5,900 | 1.04 | 0.586 | 0.0649 |

| Ex. No. | Wt. of product acids | Wt. of 2,3-diacid | Wt. of 2,6-diacid | Percent yield | Selectivity | Percent conversion | Remarks |
|---|---|---|---|---|---|---|---|
| 1 | 1.28 | 0.0513 | 0 | 5.00 | 0.199 | 25.2 | |
| 2 | 1.50 | 0.0662 | 0 | 6.45 | 0.533 | 12.1 | |
| 3 | 0.425 | 0.0997 | 0 | 9.46 | 0.117 | 80.6 | |
| 4 | 1.16 | 0.269 | 0 | 26.1 | 0.572 | 45.6 | |
| 5 | 0.718 | 0.108 | 0 | 21.1 | 0.567 | 37.2 | |
| 6 | 1.22 | 0.261 | 0 | 25.4 | 0.612 | 41.4 | |
| 7 | 1.22 | 0.479 | 0 | 47.1 | 0.870 | 54.2 | |
| 8 | 0.607 | 0.0080 | 0 | 18.8 | 0.490 | 38.4 | 0.020 g. Fe₂O₃ catalsyt. |
| 9 | 0.621 | 0.0896 | 0 | 18.4 | 0.586 | 31.4 | 0.30 g. Fe₃O₄ catalyst. |
| 10 | 0.647 | 0.0878 | 0 | 16.7 | 0.506 | 33.1 | 0.042 g. Fe₂O₃ catalyst. |
| 11 | 0.650 | 0.0986 | 0 | 20.0 | 0.673 | 29.7 | Thermocouple out of Liner N₂ and CO₂. |
| 12 | 0.573 | 0.0142 | 0 | 2.94 | 0.107 | 27.4 | |
| 13 | 0.371 | 0 | 0.361 | 69.0 | 0.698 | 98.8 | |
| 14 | 0.517 | 0 | 0.120 | 21.1 | 0.375 | 56.2 | Charcoal colored black; extensive decomposition 0.49 g. CdI₂ catalyst. |
| 15 | 0 | 0 | 0 | 0 | 0 | 10.0 | |
| 16 | 0.790 | 0 | 0.390 | 37.9 | 0.502 | 75.6 | |
| 17 | 0.653 | 0.138 | 0 | 24.5 | 0.576 | 42.5 | |
| 18 | 0.718 | 0.058 | 0 | 10.4 | 0.407 | 25.6 | |
| 19 | 0.641 | 0.101 | 0 | 18.2 | 0.466 | 39.0 | |
| 20 | 0.594 | 0.241 | 0 | 39.7 | 0.625 | 63.5 | N₂ and CO₂. |
| 21 | 0.337 | 0 | 0.197 | 35.4 | 0.467 | 76.6 | |
| 22 | 0.376 | 0 | 0.131 | 13.1 | 0.154 | 84.7 | |
| 23 | 0.302 | 0 | 0.153 | 27.2 | 0.326 | 83.4 | |
| 24 | 0.419 | 0 | 0.282 | 50.6 | 0.598 | 84.5 | |
| 25 | 0.282 | 0 | 0.270 | 47.5 | 0.481 | 98.7 | |
| 26 | 0.747 | 0 | 0.514 | 45.3 | 0.519 | 87.1 | Mixed 1 and 2 naphthoates. |
| 27 | 0.640 | 0.134 | 0 | 24.5 | 0.585 | 41.9 | |
| 28 | 0.786 | 0.244 | 0 | 27.7 | 0.451 | 61.3 | |
| 29 | 0.620 | 0.180 | 0 | 31.1 | 0.595 | 52.3 | |

What is claimed is:

1. A process for the preparation of 2,3-dicarboxynaphthalene from alkali metal 2-naphthoates comprising reacting under anhydrous conditions alkali metal 2-naphthoate in the substantial absence of alkali-1-naphthoate at a temperature of 300 to about 500° C. with $CO_2$ at a total pressure of at least 50 p.s.i.g., wherein when the reaction is conducted in the presence of potassium salts the temperature is maintained at from 300 to about 425° C.

2. The process of claim 1 wherein the alkali metal 2-naphthoates are selected from the group consisting of sodium-2-naphthoates and potassium-2-naphthoates.

3. The process of claim 2 wherein the reaction is conducted in the presence of a catalytic amount of a catalyst comprising a carbonate selected from the group consisting of cadmium carbonate, sodium carbonate and potassium carbonate.

4. The process of claim 1 wherein the reaction is conducted in the presence of a catalytic amount of sodium carbonate, and in the substantial absence of potassium carbonate the temperature is maintained at from 300 to about 500° C. and the pressure is maintained at above 1,000 p.s.i.g.

5. The process of claim 1 wherein the reaction is conducted in the presence of a catalytic amount of potassium carbonate, the temperature is maintained at from about 320 to about 425° C. and the pressure is maintained at above 1,000 p.s.i.g.

6. The process of claim 1 wherein the reaction is conducted in the presence of cadmium carbonate, the temperature is maintained at from about 300 to about 500° C. and the pressure is maintained at above 50 p.s.i.g.

7. A process for the preparation of 2,3-dicarboxynaphthalene from alkali metal 2-naphthoates comprising reacting under anhydrous conditions, alkali metal 2-naphthoate with $CO_2$ in the substantial absence of alkali-1-naphthoate at a temperature of 350–425° C. and at a total pressure of at least 1,000 p.s.i.g.

8. The process of claim 7 wherein the alkali metal 2-naphthoates are selected from the groups consisting of sodium-2-naphthoates and potassium-2-naphthoates.

References Cited

UNITED STATES PATENTS

| | | | |
|---|---|---|---|
| 2,823,230 | 2/1958 | Raecke | 260—515 |
| 2,906,774 | 9/1959 | Raecke et al. | 260—515 |
| 3,038,006 | 6/1962 | Ruthruff | 260—515 |

JAMES A. PATTEN, Primary Examiner

UNITED STATES PATENT OFFICE
CERTIFICATE OF CORRECTION

Patent No. 3,487,106      Dated December 30, 1969

Inventor(s) J. W. Patton and M. O. Son, Jr.

It is certified that error appears in the above-identified patent and that said Letters Patent are hereby corrected as shown below:

| | | |
|---|---|---|
| Col. 1, line 37: | Following "2, 3-" add --naphthalene dicarboxylic acid (2, 3-NDA) by the dis-- | |
| Table 1, Example 3 | "wt of salt" to read | --2.05 |
| Table 1, Example 15 | "% conversion" to read | --100.-- |

SIGNED AND SEALED

JUL 21 1970

(SEAL)
Attest:

Edward M. Fletcher, Jr.
Attesting Officer

WILLIAM E. SCHUYLER, JR.
Commissioner of Patents